Figure 1:
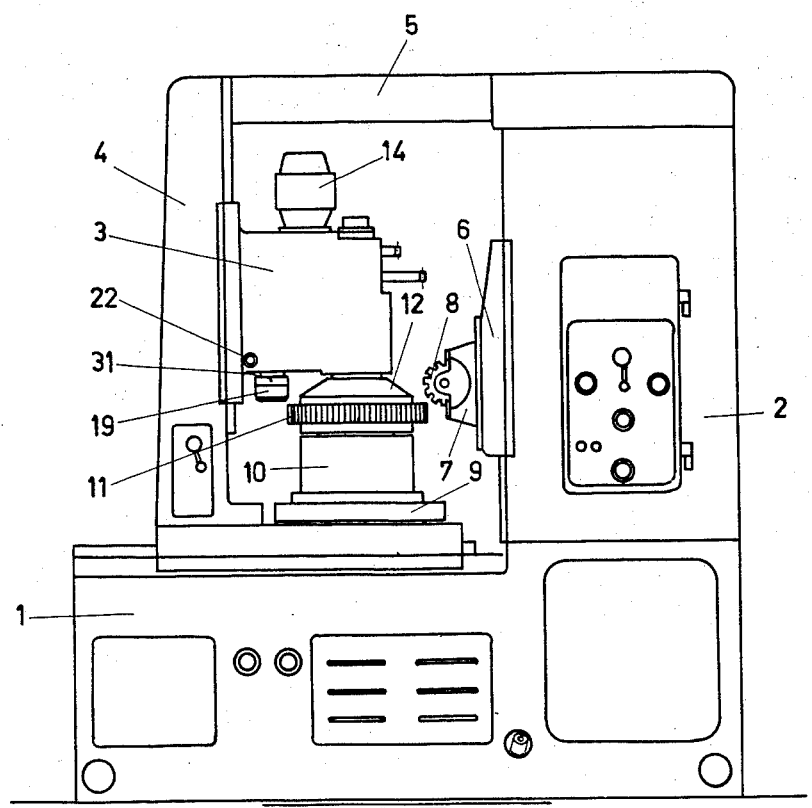

Sept. 10, 1963  E. PERGER  3,103,143
GEAR HOBBING MACHINES

Filed Oct. 9, 1961  2 Sheets-Sheet 1

INVENTOR:
ERNST PERGER
BY
McGlew and Toren
ATTORNEYS

Sept. 10, 1963                E. PERGER                3,103,143
                          GEAR HOBBING MACHINES
Filed Oct. 9, 1961                                    2 Sheets-Sheet 2

INVENTOR:
ERNST PERGER
BY
McGlew and Toren
ATTORNEYS

United States Patent Office 3,103,143
Patented Sept. 10, 1963

3,103,143
GEAR HOBBING MACHINES
Ernst Perger, Langerfelderstr. 77, Wuppertal-Langerfeld, Germany
Filed Oct. 9, 1961, Ser. No. 143,769
Claims priority, application Germany Dec. 2, 1960
8 Claims. (Cl. 90—4)

This invention relates in general to gear manufacturing devices and particularly to a new and useful gear hobbing and gear finishing machine.

Gear hobbing machines are known which include a rotatable table on which the gear workpieces are mounted and also means for automatically cutting the teeth of the gear. In such machines the hobbing or cutting tool is mounted on the milling side which in turn is arranged at the machine frame. The hobbing tool is adjusted for movement to an exact milling depth and for synchronous runs and then lateral feed or advance to effect the cutting of gear teeth with great geometric exactness.

It is common to subject teeth which are made by such machines to a finishing operation after the milling is completed. This finishing consists of a fine working of the teeth by a shaving or grinding tool which is usually in the form of a rotating wheel. Instead of a grinding wheel, it is also usual to employ a burnishing wheel. When these finishing operations are made it is necessary, besides effecting a smooth surface on the gear, to ensure geometric exactness of the tooth flanks. When these finishing and burnishing operations operate independently, a significant improvement of the surface characteristics of the tooth is obtained in addition to the desired tooth form which has already been cut or milled with exactness previously.

In prior art machines, it was usually necessary to effect the finishing operation on a separate special shaving or burnishing machine. A disadvantage of such additional machines is that the workpiece had to be transported from the hobbing machine to the finishing machine and that a great deal of time was consumed in the dismounting of the workpiece from the one machine and the mounting and centering of the workpiece on the finishing machine.

In some instances, attempts have been made to finish the workpiece at the milling station without having to change the mounting of the workpiece from one machine to the other. In such prior art constructions, it was necessary to remove the milling tool and thereafter mount the head member which carries the shaving wheel on the same side of the machine in place of the milling tool. For such a construction it is necessary that the turntable have a movable work gear and a second drive for the table by means of a spur wheel drive. Therefore, this arrangement was used exclusively for very large and very heavy workpieces which were not produced in great numbers and had a relatively short milling period. In such instances a considerable time required to rearrange the machine by exchanging the milling element for the shaving element was not a material disadvantage.

In many instances, however, it is essential that gears be produced within a short period of time and wherein the milling times are very short, so that the output of the gear hobbing machine has to be considerable in order to be economical. Therefore, it is essential that the time loss incurred by changing from milling to finishing be drastically reduced. In addition, it is essential that the exactness which has been obtained during milling operations should not be endangered by dismounting the workpiece and then remounting it for finishing operation.

In accordance with the present invention, there is provided a machine which includes a rotatable workpiece table adjacent one side of which there is arranged a miller or cutting tool mounted for operational movement in a controlled sequence and timed relationship to the indexing of the work table. In addition, on the opposite side of the machine there is mounted finishing tools which advantageously include separate shaving and burnishing tools which operatively contact the workpiece to finish the portions which have been previously milled. The arrangement includes coupling means to rotate the work table during the finishing operations.

Accordingly, it is an object of this invention to provide an improved combination hobbing and finishing machine for manufacturing gear pieces.

A further object of this invention is to provide a machine for manufacture of gear teeth which includes means for milling the teeth and for finishing the surface of the gear during the time interval between milling cycles.

A further object of the invention is to provide a machine for manufacturing gears which includes a rotary work table, with a milling tool movable to cut gear teeth on a workpiece positioned on said table arranged on one side thereof and a finishing tool disposed for operative engagement with the workpiece on the opposite side thereof.

A further object of the invention is to provide a combination hobbing and finishing machine for manufacturing gears which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
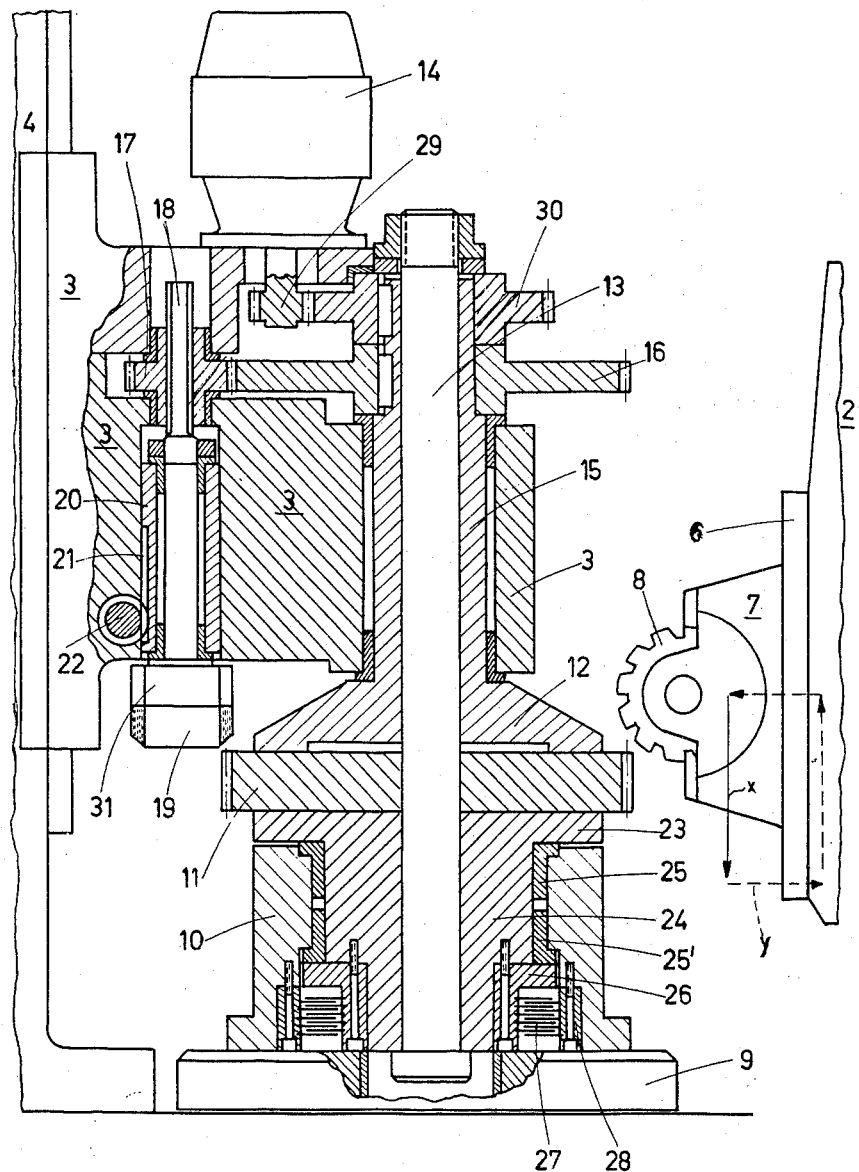

In the drawings:

FIG. 1 is a side elevation of a combination gear hobbing and finishing machine constructed in accordance with the invention; and FIG. 2 is an enlarged fragmentary vertical section of a portion of the machine indicated in FIG. 1.

Referring to FIG. 1 of the drawing in particular, the invention embodied therein includes a machine bed or base 1 having a stand 2 on one side and a counter stand 4 on the other which carries a displaceable counter holder or block 3. The counter stand 4 is connected with the stand 2 by a cross member 5.

In accordance with the invention, a milling slide 6 is mounted on the stand 2 for movement. The milling stand carries a milling head 7 with a hobbing tool 8.

A central turntable 9 is arranged on the bed 1 for rotatable movement thereon and is driven synchronous to the milling shaft driving the milling head 7 by means of a worm gear (not shown). A cylindrical workpiece carrier 10 is mounted on the turntable 9 for rotation therewith and the carrier 10 rotatably supports a cylindrical or pin portion 24 of a workpiece supporting table 23. A workpiece 11 is mounted on the workpiece supporting table 23 and is clamped in position thereon by a counter holding plate portion 12 of a hollow spindle or hub member 15. A centering mandrel 13 extends vertically upwardly through central bores in the pin portion 24 of the workpiece supporting table 23, the workpiece 11, the plate portion 12, and the hollow spindle 15.

The upper end of the hollow spindle 15 carries a large diameter gear 16 and a smaller diameter gear 30. An electric motor 14 is mounted on the counter holder 3 and is provided with a pinion 29 which meshes with and rotates the gear 30 and the hollow spindle 15 along with the plate portion 12. When the motor 14 is operated, gear 29 drives through gear 30 to cause rotation of spindle 15 with the workpiece 11 and the supporting table 23 while the carrier 10 and the roundtable 9 are maintained at rest.

Gear 16 rotates a gear 17 which is affixed to a feed spindle 18. The feed spindle 18 carries at its free end a shaving wheel 19. The shaving wheel 19 is formed of a hardened or tempered gear wheel having the most exact tooth form, the tooth flanks of the wheel having fine knife edges. In addition to the shaving wheel 19, there is advantageously provided at the end of the feed spindle behind the shaving wheel 19 an additional burnishing wheel 31.

The feed spindle 18 is rigidly mounted in the bushing 20. The bushing 20 has a gear rod 21 having teeth therein which engage an adjusting screw means such as spindle 22. Rotation of the adjusting spindle 22 effects movement of the shaving wheel in and out of the plane of the workpiece 11.

It should be appreciated that the feed spindle 18 may also be mounted in a manner permitting it to be displaced radially against the mounting axis of the workpiece and adjust displacement obliquely relative to the mounting axis.

The workpiece carrier 10 rotatably supports the cylindrical portion or pin 24 of the supporting table 23 in bearings 25, 25'. At the end of the pin 24 there is arranged a coupling plate 26 on which coupling members 27 are arranged which extend radially outwardly between alternately positioned similar plates 27' carried by the carrier 10. The coupling members 27 engage counter members 27' of a coupling ring 28 which ring is held fast on the workpiece carrier 10. The actuation of the coupling members or plates 27 is advantageously effected by electromagnetic movement back and forth. During this electromagnetic movement the plates 27, 27' are electromagnetically pressed together in the usual well known, operational manner of an electromagnetic clutch. In the actuated, pressed together position the pin 24 and the workpiece table 23 will rotate together with the carrier 10 and the roundtable 9. The clutch is actuated by electrical means (not shown) when it is desired to rotate the workpiece 11 for effecting milling operations by the hobbing tool 8.

The workpiece 11, therefore, in its mounted position can be released from the forced synchronous drive by the turntable 9 by relieving the couplings 26 through 28.

The centering mandrel 13 passes through the pin 24 of the disk 23 and passes through the central bore of the workpiece 11 into the drive spindle 15.

The operation of the device is as follows:

After the workpiece 11 has been mounted, the milling tool 8 is advanced to the desired milling depth in the direction of the arrow indicated at "x." When this takes place, the workpiece 11 which, by means of couplings 26, 27, 28 is rigidly coupled with the turntable 9, turns in a synchronous manner to the rotation of the milling tool 8. In so doing, and while the milling tool longitudinally advances relative to the workpiece, the gear shape is milled or cut out.

After the milling or cutting has progressed to termination, an automatic control is actuated which moves the milling tool into the starting position as schematically indicated by the dotted line direction of movement "y." As soon as the milling tool 8 has been disengaged from the workpiece, the coupling 27 is released and the motor 14 is started. Thereupon the feed spindle 18 is moved downwardly. This causes the shaving wheel 19 to come into engagement with the gears of the workpiece 11 and while the workpiece and the shaving wheel are rotated relatively very fast, the workpiece is shaved.

By moving the feed spindle 18 still further downwardly, the burnishing wheel 31 comes into action relative to the gearing of the workpiece 11 and the shaving wheel 19 moves out of engagement therewith in a downward direction. The burnishing wheel action causes a polishing of the tooth flanks. During this operation, it is advantageous to cool the parts by use of a cooling oil.

The workpiece 11 may be removed from the mandrel 13 by unfastening the securing nut at its top end and by raising the counter holder 3 to cause the spindle 15 with the plate portion 14 to be slid upwardly off the mandrel. The complete upward movement of the carrier 3 beyond the upper end of the mandrel 13 is not necessary because the mandrel may be dropped downwardly into an opening in the turntable 9 after the nut at the upper end is removed.

It is not necessary with such a machine to transport the workpiece from one machine to another. It is not necessary to repeatedly mount and align the workpiece and even the idling time of the hobbing portion of the machine is utilized for the finishing procedure. This idling time, which necessarily has to occur when the milling tool is retracted from the workpiece, is utilized to effect the finishing operation. Due to the simple finishing procedure on the same machine, the entire working cycle is shortened. In addition, the milling operation need not be effected with such great geometrical precision or with great surface smoothness because the finishing procedure is so effective. In addition, the previously required great exactness in producing the hobbing tool and its adjustment in the machine is not necessary anymore and the gear of the hobbying machine need not be as exact. This, in turn, results in easier sharpening of the milling tool, and moreover the maintenance and the adjustment of the machine is made simpler because the high precision required by previous machines is no longer required.

The surface quality of the teeth made by the machine construction made in accordance with the invention is excellent due to the fact that a burnishing wheel is provided in addition to the shaving wheel and both the shaving wheel and the burnishing wheel contribute to the excellent surface quality.

While a specific embodiment of the invention has been shown and described in detail to illustrate the application of the inventive principles, it will be understood that the invention may be embodied otherwise without departing from such principles.

What is claimed is:

1. A gear-forming machine capable of milling and finish shaving a gear workpiece without changing the mounting of the workpiece, comprising a rotatable roundtable, a supporting table for the workpiece rotatable therein, a spindle connected to said supporting table for rotating said workpiece supporting table, said machine characterized by a shaving wheel, means rotatably supporting said shaving wheel adjacent the workpiece supporting table and permitting displacement of said shaving wheels toward and away from the workpiece thereon, gear means driving said shaving wheel from said spindle, and coupling means for selectively coupling and disengaging said roundtable from said supporting table.

2. A gear-forming machine according to claim 1, including a driving electric motor mounted on said means supporting said shaving wheel and drive means connecting said driving motor to said spindle for rotating said spindle.

3. A gear-forming machine according to claim 1, wherein said coupling means includes an electromagnetic coupling.

4. A gear-forming machine according to claim 1, wherein said finishing tool includes a polishing wheel.

5. A machine for both milling and shaving gears with separately operable milling and cutting tools, comprising, a rotatable carrier adapted to be rotated in timed relationship to the milling tool, a workpiece supporting member rotatably mounted on said carrier, a spindle connected to said workpiece supporting member, a rotatable shaving tool, a holder rotatably supporting said shaving tool, said shaving tool being displaceable in said holder for movement toward and away from a workpiece positioned on said workpiece supporting member, means drivingly connecting said shaving tool and said spindle, means to rotate said spindle and thereby to rotate said shaving tool, and coupling means for selectively decoupling and coupling said carrier and said workpiece supporting member for permitting separate rotative movement of said workpiece supporting member with said spindle and said shaving tool, and alternatively for permitting rotative movement of said workpiece supporting table with said carrier for co-operative movement together when the milling tool is operative on the workpiece.

6. A machine according to claim 5, including a centering mandrel extending upwardly through said workpiece supporting member for positioning a workpiece therearound, said holder for said shaving tool rotatably journalling said spindle.

7. A machine according to claim 5, wherein said finishing tool is held on a bushing which is vertically movable in said holder for adjusting said finishing tool in respect to the workpiece on said workpiece supporting member.

8. A machine for both milling and shaving gears with separately operable milling and finishing tools, comprising a rotatable carrier, a workpiece supporting member rotatably mounted on said carrier, a rotary gear cutting tool, means mounting said gear cutting tool for rotation adjacent said workpiece supporting member, said mounting means being movable for moving said cutting tool in relation to a workipece positioned on said workpiece supporting member, a spindle connected to said workpiece, supporting member, a rotatable finishing tool, a holder rotatably supporting said finishing tool, said finishing tool being displaceable in said holder for movement toward and away from a workpiece positioned on a workpiece supporting member, means connecting said finishing tool with said spindle for driving rotation of said finishing tool with said spindle, means to rotate said spindle and thereby said finishing tool, and coupling means for selectively coupling said carrier and said workpiece supporting member for permitting separate rotative movement of said workpiece supporting member with said spindle and said finishing tool, and alternatively for permitting rotative movement of said workpiece supporting member with said carrier for co-operative movement together when said cutting tool is to be operative on the workpiece.

References Cited in the file of this patent

UNITED STATES PATENTS

| | | |
|---|---|---|
| 1,022,667 | Fawcus | Apr. 9, 1912 |
| 2,330,167 | Zimmermann | Sept. 21, 1943 |
| 2,330,168 | Zimmermann | Sept. 21, 1943 |
| 2,393,696 | Kraut et al. | Jan. 29, 1946 |
| 2,953,067 | Ufert | Sept. 20, 1960 |